May 15, 1951     A. C. KOETT     2,553,416
UNIVERSAL DRILL HEAD
Filed Sept. 18, 1946
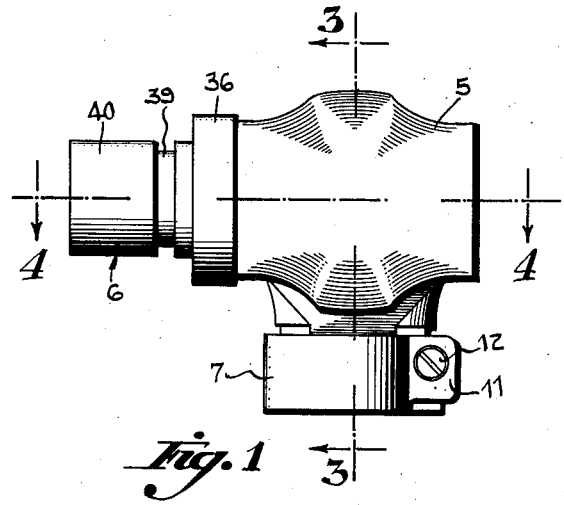
Fig. 1
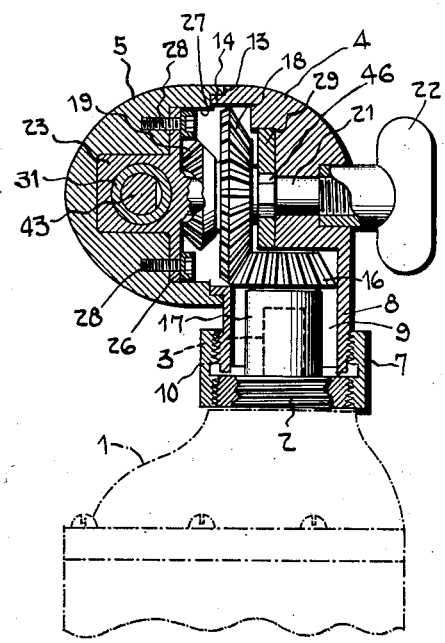
Fig. 3
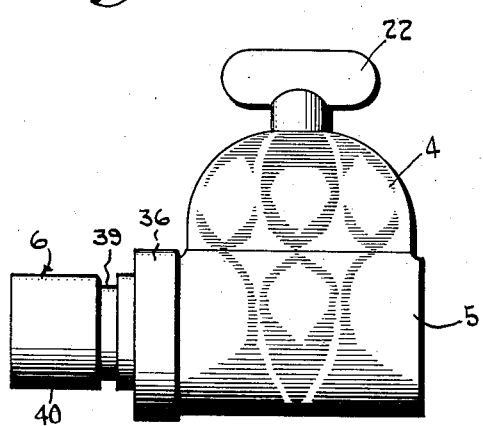
Fig. 2
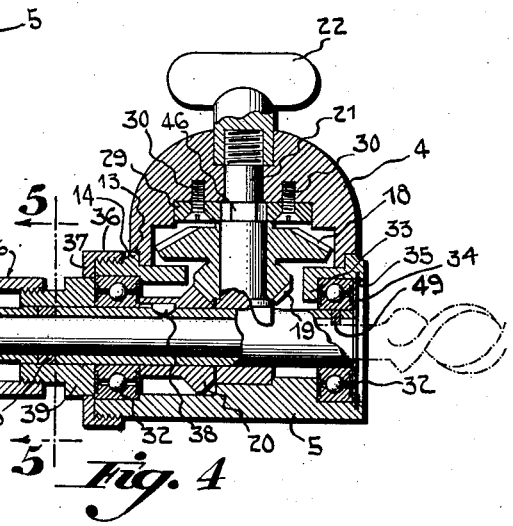
Fig. 4
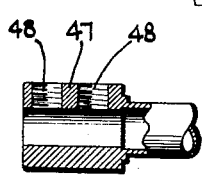
Fig. 6
Fig. 5
INVENTOR.
Albert C. Koett
BY
Wood, Aury, Herron & Evans
ATTORNEYS Patented May 15, 1951

2,553,416

UNITED STATES PATENT OFFICE 2,553,416

UNIVERSAL DRILL HEAD

Albert C. Koett, Cincinnati, Ohio, assignor to The Kett Tool Company, Cincinnati, Ohio, a corporation of Ohio Application September 18, 1946, Serial No. 697,654

9 Claims. (Cl. 74—385)

This invention relates to electric driven portable tools and is directed particularly to a universal head adapted for association with a portable electric drill or the like for the purpose of supporting and driving a drill bit laterally or at an angle to the axis of the portable electric drill.

The principal purpose of the device has been to provide an attachment for an electric drill which will enable holes to be bored in spaces too confined to permit the electric drill to be used in a conventional way. For instance, a drill equipped with a universal head constructed in accordance with the present invention is especially adapted for use in drilling holes for insulators in joists of a building which usually are spaced too close together to permit a conventional electric drill and bit to be arranged within the space between the joists.

The present improvement consists essentially of a housing adapted to be mounted on an electric drill, a second casing adjustably mounted upon the first for supporting a chuck disposed laterally with respect to the axis of the electric drill, and a gear train for transmitting rotary motion of the electric drill through the housings to the chuck.

In more detail, however, the principal objective of this invention has been to provide an improved construction which is simple and therefore inexpensive to manufacture, of low overall weight so as to facilitate its use by a workman over prolonged periods of time, and also more sturdy than the units which have been available, whereby drills or bits of substantial diameter may be operated.

In order to reduce the weight of the unit as a whole the housings of which it is comprised are in the form of castings of aluminum or magnesium. These metals display poor qualities of wear resistance and, in order to prevent deterioration during use, wear resistant elements of hardened and ground steel are associated with the housing, with a minimum increase in the weight and with no increase in the size or compactness of the assembly.

A further objective of this invention has been to provide a unit with which an elongated drill bit extensibly is associated by means of a bottomless chuck arranged to receive the drill shank telescopically. The purpose of this construction is to enable holes to be bored to the full depth of the drill shank from working spaces which are substantially no greater than the overall length of the drill itself. In use, the drill initially is coupled with the chuck disposed near the working end of the drill and, when a hole to this depth has been drilled, then the chuck is loosened so as to permit an additional length of drill to be moved forwardly after which the chuck is tightened to permit the drill to bore a deeper hole and so on until a hole of substantially the full drill length has been bored.

A unit constructed to provide these improved results is shown in the accompanying drawings in which:

Figure 1 is a side elevation.

Figure 2 is a plan view of the device.

Figure 3 is a sectional view taken on the line 3—3 of Figure 1.

Figure 4 is a sectional view taken on the line 4—4 of Figure 1.

Figure 5 is a sectional view taken on the line 5—5 of Figure 4.

Figure 6 is a longitudinal sectional view of a modified form of chuck or drill holder for the unit.

The device shown in the drawings is adapted to be associated with a conventional power drill 1 which is shown fragmentarily in Figure 3 in the dot and dash lines. A drill of this type conventionally is equipped with a threaded coupling 2 adjacent the spindle 3 of the apparatus. Ordinarily a cap is associated with the coupling 2 and a drill chuck is mounted upon the spindle 3. However, for use of the present device with the electric drill the cap and drill chuck are removed so as to make the apparatus ready to receive the universal head.

The head consists of cooperating members indicated generally at 4 and 5, the latter terminating in a chuck 6 and the former terminating in a clamping collar 7.

The clamping collar is employed as a means for fastening the universal head to the threaded coupling 2 of the body of the power drill. For this purpose the head member 4 is provided with an annular wall 8 delineating an entrance cavity 9 to receive the spindle 3 of the electric drill. The annular wall 8 is threaded at its outer surface as at 10, preferably with left hand threads. Collar 7 is in the form of a split ring including bosses or lugs 11 at opposite sides of the points where the ring is split. A clamp screw 12 passes through one of these bosses into threaded engagement with the other so as to draw the bosses toward one another and thereby contract the diameter of the ring and bind it both to the drill body and to the housing 4.

In the preferred construction one endwise portion of the ring is threaded internally to engage the left hand threads upon the housing 4 while the opposite endwise portion is threaded to engage the right hand threads upon the collar of the drill body. In this manner the rotation of the collar draws the universal head toward the portable drill and holds the universal head accurately in alignment with the drill spindle. Subsequently, as screw 12 is tightened, a very rigid connection is established.

The housing 4 at its opposite end terminates in a face 13 which is disposed in a plane parallel with the axis of the drill spindle 3 and this face is provided with an annular flange 14 for a rabbeted connection with a recess formed in a cooperating face of the housing member 5. The housing member 5 thus is rotatable in a plane of revolution parallel to the axis of the drill spindle 3 and the housing 4 may be shifted rotationally about the coupling 2. The two housings, in effect, establish substantially a universal connection between the drill housing 1 and the drill chuck 6 whereby the chuck can be disposed in many different positions with respect to the body of the portable drill, to suit working conditions or space limitations.

The internal details of construction are shown in Figures 3 and 4. The transmission system for imparting rotary motion from the drill spindle 3 to the chuck 6 includes a bevel gear 16 which is formed at the end of a circular nut 17 threaded or bored for engagement with the drill spindle 3 in any suitable manner. Bevel gear 16 cooperates with bevel gear 18 which is one member of a couplet, the other bevel gear 19 of which is in meshing engagement with a bevel gear 20 (Figure 4) keyed to the sleeve by which the chuck 6 is driven. As housing 5 is rotatably adjusted about housing 4 to a key position the bevel gears track one upon the other and at all times remain in operative engagement with one another.

In boring holes by means of bits of substantial diameter heavy thrust end torque loads are developed which the gearing system must withstand. The electric drill is constructed, interiorly of drill spindle 3, to accept the thrust loads of the bevel gear 16. The gear couplet 18 and 19 is rotatably mounted upon a shaft 21 having one end fastened to one of the housing members while the opposite end extends through the other of the housing members to carry a wing nut 22 by means of which the two housing members are drawn together and held in any angular position in which they may have been set in respect to one another. It will be understood that this shaft, 21, is on an axis which must bisect the axis of chuck 6. At the same time, however, as previously described, it is desirable that the chuck may be arranged telescopically to receive the drill shank in order to permit the drill to be mounted in various positions of longitudinal extension from the chuck.

The structure shown in Figure 3 which accommodates both requirements consists of a flanged head 23 provided upon the end of cross shaft 21 and arranged to be received within a recess in the housing member 5. The flange 26 of this head is seated upon the bottom of recess 27 formed within the housing 5, and screws 28 pass through the flange into the body of the housing 5 thereby holding the shaft 21 in rigid fixed position upon the housing 5. One of the virtues of this construction is that the recess 27 may be bored in concentric alignment with the recess at the face of this housing member which engages flange 14. At the same time flange 14 may be bored conveniently in concentric alignment with the bore in housing member 4 through which shaft 21 is to extend. Thus, the flange 26 may be constructed to fit snugly within the recess 27 thereby conveniently disposing the shaft 21 in axial alignment with the bore in the housing 4 through which it is to pass. In this manner the parts conveniently may be arranged to fit precisely one within another with a minimum machining cost.

For the purpose of clearing bevel gear 20, the flanges 26 are relatively narrow and extend in opposite directions from the head portion 23 of the cross shaft 21. The housing 4 is provided with a wear plate 29 of hardened steel, this plate being held in place by means of screws 30 which pass through the plate into threaded bores in the body of the housing 4. Thus, the opposite ends of the couplet of gears 18 and 19 bear respectively upon the wear plate 29 and upon the surface of the head portion 23 of the cross shaft 21 both of which are made of hardened wear resistant materials to withstand the loads to which they are subjected, without deterioration.

The head portion 23 is bored transversely in alignment with the axis of the chuck 6, to permit a hollow spindle member 31 to pass therethrough. This spindle is journalled in ball bearings 32, the outer races of which are located in bores at the front and rear ends of the housing 5. Preferably, the bore at the rear of the housing 5 terminates in a shoulder 33 which forms a seat for the rear ball bearing, while the housing at the front thereof is counterbored to provide a shoulder for the front ball bearing. The rear ball bearing is held in place against longitudinal movement by means of a plate 34 which is held in position through a snap ring 35, while the front ball bearing is held in place by means of a cap 36 threaded upon the housing 5 and presenting a flange 37 extending inwardly to embrace the outer race of the ball bearing unit.

Bevel gear 20 is secured to the hollow spindle by means of a key 38. A threaded nipple 39 is fastened rigidly to the hollow spindle 38, preferably by press fitting the nipple upon the spindle, at the portion thereof extending beyond the front ball bearing. This nipple receives a chuck nut 40 which is arranged to actuate the jaws of a split collet 41. Thus, as the chuck nut 40 is tightened the tapered surface 42 of the nut bears upon a surface of complementary taper on the collet so as to squeeze and bind the collet upon the shank 43 of the drill bit 44. The frictional connection formed in this manner is suitable for driving the drill bit under ordinary conditions of usage. However, if the drill bit is of substantial size difficulty may be encountered in tightening the chuck nut sufficiently to hold the bit against slippage and a positive type of drive is desirable in such instances.

In the present apparatus a positive drive is incorporated conveniently by flattening the drill shank substantially to the cross section shown in Figure 5 and disposing in fixed position on the hollow spindle a driving member 45 of complementary configuration. This unit, likewise, may be fastened by press fitting the driving member into the inside diameter of the threaded nipple 39, the driving member being pressed in to bear against the end of the spindle 31 as shown in Figure 4. Therefore, the driving torque of the bevel gear 20 is transmitted to the spindle 31 through the key 38, from the spindle to the nipple 39, and from the nipple to the driving member 45.

A modified form of chuck is shown in Figure 6, comprising a cylindrical head 47 which is bored to receive the drill shank snugly. This head is bored transversely as at 48 to receive one or more set screws which bind the drill shank in the chuck. The construction is simpler and less expensive than the collet type of chuck which is shown in Figure 4 and is suitable for use with drill bits having uniform shank diameter.

Although a frictional engagement is sufficient to hold the housing 5 in its selected angular position for light service, it is desirable to provide a more positive engagement for heavy duty service, since the resistance of the drill tends to rotate the housing 5 on its shaft 21. For this purpose, the shaft 21 may include a portion 46 adapted to key the shaft to the housing 4. As illustrated, this portion may be octagonal in cross section to key with an octagonal opening through the bearing plate 29 and thus provide a series of eight positive angular positions, 45° apart, for the housing 5. In the present instance the adjustment is made by backing off the wing nut 22 a sufficient distance to withdraw the key portion of the shaft 21 from engagement with the opening of plate 29 thus permitting the housing 5 and shaft to be rotated to a different position and reengaged. The plate 29 being rigidly secured to the housing 4, securely locks the shaft and housing 5 in its selected angular position, relative to the housing 4, and prevents slippage under severe service conditions.

When deep holes are drilled it is sometimes difficult to remove the bit especially if it be of the auger type. Figure 4 shows a construction which is adapted to facilitate drill bit removal. For this purpose the rearward end of the hollow drive spindle 43 is provided with a cross key 49 presenting an inner face which extends chordally across the bore of the spindle to provide a configuration complementary to that of the flatted drill shank. The drill spindle is accessible through an opening in the end plate 35. Thus, when a deep hole has been driven the chuck is loosened and the tool is removed from the drill bit while the drill bit resides in the hole which has been bored. Then the tool is reversed and the back end of the tool is engaged with the drill bit whereby the key 49 is in driving connection with the flat of the drill bit shank. This reversal of the universal head relatively drives the drill bit in an opposite direction whereby it winds its way out of the hole previously bored.

While the universal head of the present invention has been described in connection with an electrically driven portable drill, those skilled in the art readily will understand that the apparatus is adapted to be used with a pneumatic type of tool or with a flexible shaft having a suitable means for coupling the head thereto.

Having described my invention, I claim:

1. A drill head adapted to be secured to a motor housing to permit a drill spindle journalled in the head to be angularly adjusted universally relative to the axis of the motor housing comprising; a pair of housings, one of said housings arranged to be mounted upon the motor housing, the other of said housings having a drill spindle journalled therein, a cross shaft traversing said housings at right angles to said drill spindle, and having one end permanently fixed to one of the housings and an intermediate portion releasably keyed to the other of said housings, locking means on said cross shaft for releasing the keyed housing from the cross shaft permitting said housings to be adjusted angularly relative to each other, and driving gears respectively carried upon said cross shaft and drill spindle.

2. A drill head adapted to be secured to a motor housing and adapting a drill spindle to be angularly adjusted universally relative to the axis of the motor housing, comprising; a primary gear housing adapted to be mounted upon a motor housing, a secondary gear housing, the secondary housing having a cross shaft secured thereto and extending through the primary housing at right angles to the axis of said primary housing, a releasable key on the cross shaft operable to establish a non-rotatable connection with the primary housing releasable means on said shaft for securing said housings together with the primary housing keyed to the cross shaft and for disengaging the key for adjustment of the secondary housing relative to the primary housing, a drill spindle journalled in the secondary housing at right angles to said cross shaft, gears respectively carried on said cross shaft and said drill spindle, said gears in mesh with each other and arranged to mesh with a motor drive gear to drive said drill spindle.

3. A drill head adapted to be secured to a motor housing having a drive gear and adapting a drill spindle journalled in the head to be adjusted universally relative to the axis of the motor housing comprising; a primary gear housing, means for securing said housing to the motor housing, a circular flange on said primary housing, a secondary housing, said secondary housing including a circular recess adapted to receive said circular flange on the primary housing, a cross shaft, said shaft traversing the primary housing centrally of said flange, the cross shaft having a head at the inner end thereof and the secondary housing including a second recess which is centered with respect to the first recess to receive said head, a polygonal section on said cross shaft arranged to lock said housings together in non-rotatable relationship, a drill spindle journalled in the secondary housing, and gears carried by said cross shaft and drill spindle respectively to transmit power from a drive gear of the motor housing to said drill spindle.

4. A drill head adapted to be secured to a motor housing having a drive gear and adapting a drill spindle journalled in the head to be angularly adjusted universally relative to the axis of the motor housing comprising; a primary gear housing, means for adjustably securing said housing to the motor housing, a secondary housing, a cross shaft, said cross shaft having a hardened head located centrally of said housings and secured to the secondary housing, said primary housing including an opening to receive said cross shaft, the shaft having a polygonal section adapted to key with said opening to lock the housing non-rotatably to the shaft at selected angular positions a drill spindle journalled in the secondary housing, a gear journalled on said cross shaft and a gear meshing therewith secured on the spindle, the gear on said cross shaft arranged to bear against the head of the cross shaft.

5. A drill head adapted to be secured to a motor housing having a drive gear, and adapting a drill spindle journalled in the head to be adjusted universally relative to the axis of the motor housing comprising; a primary gear housing, means for securing said housing to the motor housing, a circular flange on said primary housing, a secondary housing, said housing including a circular recess adapted to receive said circular flange, a cross shaft, said cross shaft located centrally of said circular recess and having its inner end secured to the secondary housing, said primary housing including an opening centrally of said flange to receive said cross shaft and permit rotation of the secondary housing, a polygonal section on said cross shaft, engageable with said opening to lock said housings together in non-rotatable relationship, a drill spindle journalled in the secondary housing, and gears carried by said cross shaft and drill spindle respectively to transmit power from a drive gear of the motor housing to said drill spindle.

6. A drill head adapted to be secured to a motor housing having a primary drive gear, and adapting a drill spindle to be angularly adjusted universally relative to the axis of the motor housing, comprising; a primary gear housing adapted to be mounted upon a motor housing in axial alignment therewith and arranged for adjustment in a plane radially of the motor housing, a secondary gear housing, the secondary housing having a cross shaft having an end permanently secured to the secondary housing and extending through the primary housing at right angles to the axis of said primary housing, said shaft permitting adjustment of the secondary housing angularly of the primary housing, said shaft including a disengageable key portion adapted to make a non-rotatable connection with the primary housing, means for engaging and disengaging said key portion to permit radial adjustment of the secondary housing relative to the primary housing, a gear cluster journalled on said cross shaft, said gear cluster adapted to mesh with a primary drive gear of the motor housing, a drill spindle journalled in the secondary housing, a gear secured on said spindle, said gear meshed with said gear cluster for driving said spindle.

7. In a drill head adapted to be secured to a motor housing having a drive gear and adapting a drill spindle journalled in the head to be angularly adjusted universally relative to the axis of the motor housing; a primary gear housing, means for securing said housing to the motor housing, a secondary housing, a hardened cross shaft, said cross shaft traversing said housings centrally thereof and having a head at its inner end secured to the secondary housing, a polygonal section on said shaft, a hardened plate including a complementary opening adapted to engage said polygonal section and key said plate relative to the shaft, said plate secured to said primary housing and said key section adapted to permit said secondary housing to be adjusted to a series of fixed angular adjustments relative to said secondary housing.

8. In a drill head adapted to be secured to a motor housing having a drive gear, and adapting a drill spindle journalled in the head to be adjusted universally relative to the motor housing; a primary gear housing, a secondary gear housing, said housings formed of a light weight material, a hardened cross shaft traversing said housings and secured to the secondary housing, a key section on said cross shaft, a hardened plate secured to said primary housing, said plate including an opening complementary to said key section and permitting the secondary housing to be adjusted to a series of positions relative to the primary housing, a head on said hardened cross shaft, a bevel gear journalled on the cross shaft and disposed between the head of the cross shaft and said hardened plate, said head and plate arranged to receive the end thrust of said gear.

9. A universal head adapted to be attached to a portable power source, comprising a pair of housings relatively movable with respect to one another, said housings respectively having input and output spindles and a cross shaft which is common to the axes of said respective input and output spindles, said cross shaft having an eye portion secured to one of the housings which is aligned with the output spindle and through which the output spindle passes and said cross shaft extending through the other housing and having a polygonal section adapted to key with respect to the other housing and having means associated therewith for clamping the housings one to another, said input and output spindles respectively having gears thereon and said cross shaft having a gear coupled thereon which is in train connection with the gears upon the input and output spindles.

ALBERT C. KOETT.

REFERENCES CITED

The following references are of record in the file of this patent:

UNITED STATES PATENTS

| Number | Name | Date |
| --- | --- | --- |
| 381,196 | Winn | Apr. 17, 1888 |
| 881,865 | Nichols | Mar. 10, 1908 |
| 913,172 | Smith et al. | Feb. 23, 1909 |
| 1,080,356 | MacGregor | Dec. 2, 1913 |
| 1,154,035 | Locke | Sept. 21, 1915 |
| 1,298,653 | Bockshe | Apr. 1, 1919 |
| 1,390,484 | Bell | Sept. 13, 1921 |
| 1,435,162 | Keck | Nov. 14, 1922 |
| 1,576,773 | McArdle et al. | Mar. 16, 1926 |
| 1,634,322 | Dornes | July 5, 1927 |
| 1,674,400 | Kocourek | June 19, 1928 |
| 1,745,779 | Carson et al. | Feb. 4, 1930 |
| 1,918,649 | Krohl | July 18, 1933 |
| 2,106,937 | Torbert | Feb. 1, 1938 |
| 2,235,427 | Harris | Mar. 18, 1941 |